United States Patent [19]

Sakuma et al.

[11] Patent Number: 5,296,771
[45] Date of Patent: Mar. 22, 1994

[54] MINIATURE MOTOR

[75] Inventors: Eiichi Sakuma; Kazumasa Saiga; Yuji Kashiwazaki, all of Matsudo, Japan

[73] Assignee: Mabuchi Motor Co., Ltd., Chiba, Japan

[21] Appl. No.: 990,324

[22] Filed: Dec. 14, 1992

[30] Foreign Application Priority Data

Dec. 17, 1991 [JP] Japan .................. 3-103870[U]

[51] Int. Cl.⁵ .............................. H02K 13/06
[52] U.S. Cl. .......................... 310/220; 310/40 MM
[58] Field of Search ............ 310/220, 221, 222, 365, 310/366, 369, 40 MM, 47

[56] References Cited

U.S. PATENT DOCUMENTS

| 4,329,605 | 5/1982 | Angi et al. | 310/68 R |
| 4,644,804 | 2/1987 | Ramm et al. | 310/338 |
| 4,769,566 | 9/1988 | Matsuda | 310/40 MM |
| 4,833,357 | 5/1989 | Tamura et al. | 310/221 |
| 4,888,511 | 12/1989 | Aoki | 310/237 |
| 5,079,468 | 1/1992 | Sata | 310/168 |

FOREIGN PATENT DOCUMENTS

| 1938229 | 4/1972 | Fed. Rep. of Germany | 310/220 |
| 14709 | 2/1976 | Japan | 310/220 |
| 42457 | 3/1976 | Japan | 310/220 |

OTHER PUBLICATIONS

Abstract JP55034872, vol. 004067, Matsushita Electric Works Ltd, May 20, 1980.
Abstract JP2246750, vol. 014568, Shibaura Eng Works Co Ltd, Dec. 18, 1990.
Machine Design, vol. 62, Feb. 22, 1990, pp. 69-72 "Built-in Arc Suppressors Boost Cup-Motor Life".
Abstract JP52051504, vol. 001119, Matsushita Electric Works Ltd, Oct. 11, 1977.
Abstract JP3270662, vol. 016088, Hitachi Ltd, Mar. 4, 1992.
Abstract JP3143253, vol. 015365, Matsushita Electric Works Ltd, Sep. 13, 1991.
Built-in Arc Suppressors Boost Machine Design Cup-Motor Life, Feb. 22, 1990, No. 4, Cleveland, Ohio, US.

Primary Examiner—R. Skudy
Assistant Examiner—Matthew Nguyen
Attorney, Agent, or Firm—McGlew and Tuttle

[57] ABSTRACT

A miniature motor including a housing formed into a bottomed hollow cylindrical shape, on the inner circumferential surface of which a permanent magnet is fixedly fitted; A rotor is provided having an armature, a spark-quenching element and a commutator. An end bracket is provided having brushes fitted to the open end of the housing and making sliding contact with the commutator. Input terminals are electrically connected to the brushes; The rotor is rotatably supported by bearings provided on the housing and the end bracket, in which the spark-quenching element is formed by a laminated ceramic capacitor formed into a ring shape, having on the outer surface thereof the same number of electrodes as the number of poles of the armature; The electrostatic capacity of the capacitor is more than 1 $\mu F$.

5 Claims, 4 Drawing Sheets

MINIATURE MOTOR

BACKGROUND OF THE INVENTION

This invention relates generally to a miniature motor used for electric shavers and hair driers, for example, and more particularly to an improvement invention aimed at improving the performance (torque, service life, etc.) of a miniature motor having a spark-quenching element, and making motor thickness thinner.

DESCRIPTION OF THE PRIOR ART

FIG. 1 is a longitudinal sectional view illustrating the essential part of a miniature motor to which this invention is applied. In FIG. 1, numeral 1 refers to a housing made of a metallic material, such as mild steel, and formed into a bottomed hollow cylindrical shape, to the inner circumferential surface of which a permanent magnet 2 formed into an arc-segment shape, for example, is fixedly fitted. In the housing 1, a rotor 5 consisting of an armature 3 facing the permanent magnet 2 and a commutator 4 is fitted. Numeral 6 refers to an end bracket made of an insulating material and fitted to the open end of the housing 1.

Numeral 7 refers to brushes made of an electrically conductive material; the free ends thereof making sliding contact with the commutator 4. The brushes 7 are provided on the end bracket 6, together with input terminals 8 electrically connected to the brushes 7. Numerals 9 and 10 refer to bearings fixedly fitted to the bottom of the housing 1 and the center of the end bracket 6 for rotatably supporting a shaft 11 constituting the rotor 5.

With the aforementioned construction, as current is fed to the armature 3 via the commutator constituting the rotor 5, the input terminals 8 and the brushes 7, rotating force is imparted to the armature 3 existing in a magnetic field formed by the permanent magnet 2 fixedly fitted to the inner circumferential surface of the housing 1, thereby causing the rotor 5 to rotate to drive external equipment (not shown) via the shaft 11.

The miniature motor of the aforementioned construction has not only a high power but also such excellent properties that speed and positioning control can be easily effected by using electronic circuits. This type of miniature motor, on the other hand, has such disadvantages as mutual abrasion and spark generation because the commutator 4 rotates while making sliding contact with the brushes 7.

To overcome the above disadvantages, a miniature motor having a spark-quenching element has already been proposed. FIGS. 2A and 2B are a left-hand side view and front view illustrating an example of the rotor of a miniature motor having a spark-quenching element. Like parts are indicated by like numerals used in FIG. 1. In FIGS. 2A and 2B, numeral 12 refers to a substrate provided between the armature 3 and the commutator 4, to which electrolytic capacitors 13 are fixedly fitted. Three pieces, for example, of the electrolytic capacitors 13 are connected as shown in FIG. 4. In FIG. 4, numeral 14 refers to a coil constituting the armature 3 shown in FIG. 1, connected in parallel with the electrolytic capacitors 13.

The spark-quenching element having the above construction, however, requires a total of 4 pieces of components, i.e., a substrate 12 and three electrolytic capacitors 13, making assembly troublesome. Since the electrolytic capacitors 13 are fitted in the slots 3a of the armature 3, as shown in FIGS. 2A and 2B, there is a limitation in space. That is, if the electrostatic capacity of the electrolytic capacitors 13 is made larger, the space factor of the coil 3b that determines the torque of a miniature motor is limited accordingly. When fitting the electrolytic capacitors 13, the insulating coating of the coil 3b may be damaged, causing shortcircuiting between layers. Furthermore, the lead wires 13a of the electrolytic capacitors 13 protruded from the substrate 12 could deter the efforts to make the thickness of miniature motor thinner.

FIGS. 3A and 3B are a plan view and a side view illustrating another example of spark-quenching element, as disclosed in Japanese Published Unexamined Utility Model Application No. 14709/1976, for example. In FIGS. 3A and 3B, numeral 15 refers to a substrate made of an insulating material and formed into a ring shape and having a plurality of electrodes 16 applied on the surface thereof; chip capacitors 17 being mounted across the electrodes 16 and 16. When chip capacitors 17 having a large capacity are used, however, the thickness of the chip capacitors 17 increases, and the thickness of the substrate 15 also has to be increased accordingly. This also presents a problem of inhibiting the tendency toward making miniature motors thinner.

In addition, there is an example in which washer-type varistors are used as spark-quenching elements, as disclosed in Japanese Published Unexamined Utility Model Application No. 42457/1976, for example. In this example, a plurality of divided electrodes are formed on at least the circumferential surface of a varistor proper formed into a ring shape, with the electrostatic capacity of the varistor being as small as dozens of nF. At high voltages over 30 V, for example, the dispersion of varistor voltage becomes extremely large, increasing the dispersion of the spark-quenching effect. Furthermore, the electrostatic capacity becomes as small as a few nF in inverse proportion to the varistor voltage.

In a miniature motor involving low voltages as low as 2.4 V, for example, large current is needed to obtain high power. In this case, the service life of a miniature motor can be improved by the characteristics of the varistor proper so long as the voltage is within the range of 2.4–30 V. When varistors are used in a miniature motor having a high-voltage specification with a motor terminal voltage of over 30 V, as described above, and that having a large-current and high-output specification of under 2.4 V, the electrostatic capacity of the spark-quenching element could be insufficient, leading to insufficient spark-quenching effect between the commutator 4 and the brushes 7 (refer to FIG. 1). This does not lend itself to improvement in the service life of miniature motors.

SUMMARY OF THE INVENTION

This invention is intended to solve these problems inherent in the prior art. It is an object of this invention to provide a miniature motor in which a small number of components are required for the spark-quenching element, motor torque and service life can be improved, and the thickness of the motor can be reduced.

DETAILED DESCRIPTION OF THE EMBODIMENTS

Figure 1:
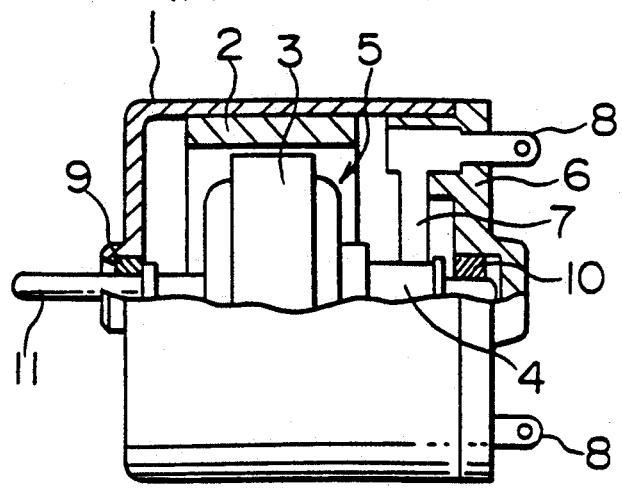
FIG. 1 is a longitudinal sectional view illustrating an example of miniature motor to which this invention is applied.
Figure 2A:
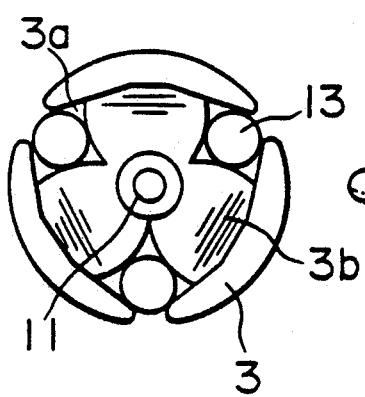
FIGS. 2A and 2B are a left-hand side view and front view illustrating an example of a rotor of a conventional miniature motor having a spark-quenching element.
Figure 2B:
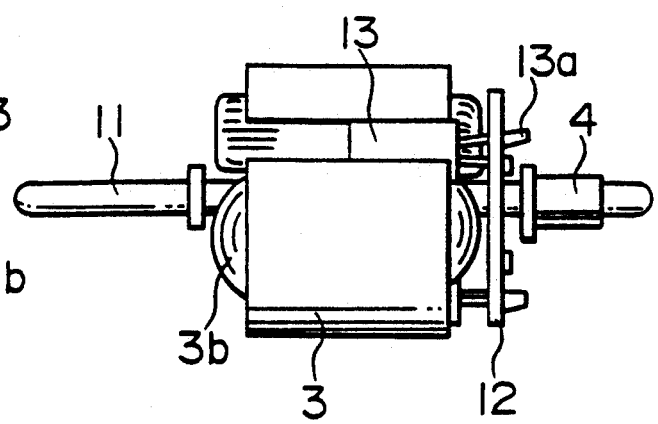
Figure 3A:
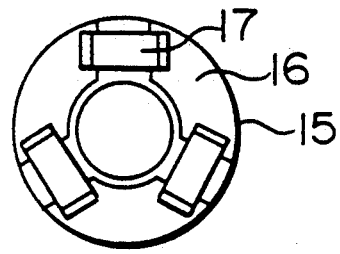
FIGS. 3A and 3B are a plan view and side view illustrating other examples of spark-quenching elements.
Figure 3B:
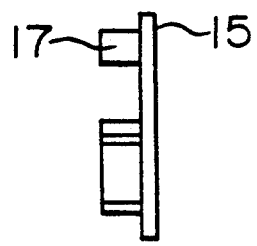
Figure 4:
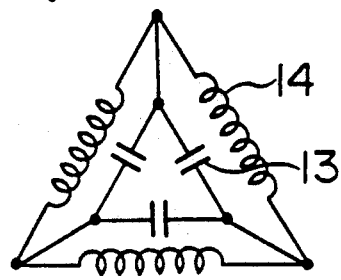
FIG. 4 is an equivalent circuit diagram illustrating the state of electrical connection of capacitors and coils.
Figure 5:
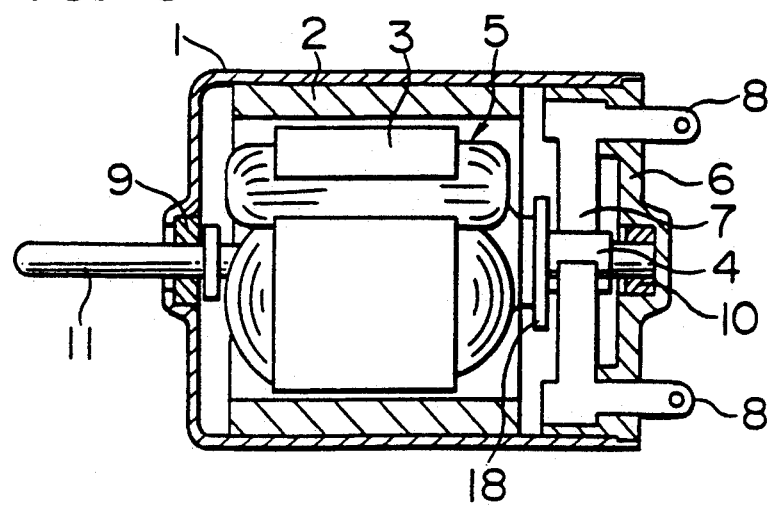
FIG. 5 is a longitudinal sectional view illustrating an embodiment of this invention.
Figure 6:
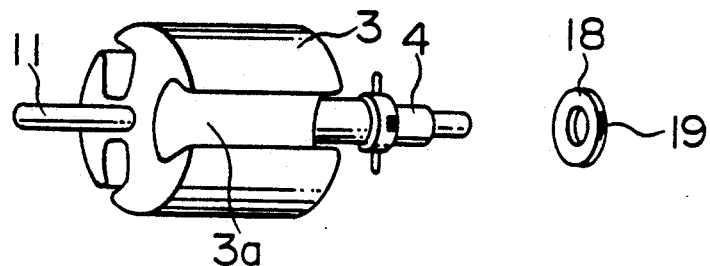
FIG. 6 is an exploded perspective view of major components shown in FIG. 5.

FIG. 5 is a longitudinal sectional view of an embodiment of this invention. FIG. 6 is an exploded perspective view of major components shown in FIG. 5. Like parts are indicated by like numerals used in FIGS. 1, and 2A and 2B. In FIGS. 5 and 6, numeral 18 refers to a spark-quenching element comprising a laminated ceramic capacitor made of a highly dielectric ceramic material, such as barium titanate, which will be described later. That is, the spark-quenching element 18 is formed into a ring shape and having on the outer periphery thereof the same number (three in this embodiment) of electrodes 19 as the number of poles of the armature 3; the spark-quenching element being fitted to the shaft 11 between the armature 3 and the commutator 4.

Figure 7:
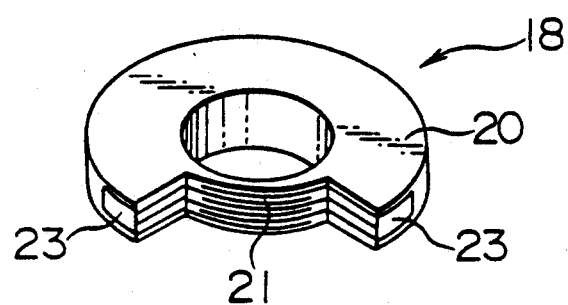
FIG. 7 is a partly cutaway enlarged perspective view of the spark-quenching element shown in FIGS. 5 and 6.
Figure 8:
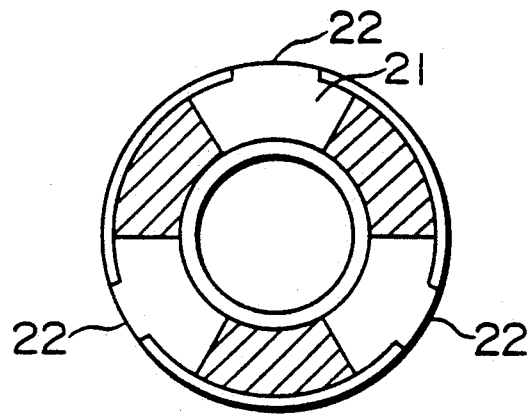
FIG. 8 is a diagram of assistance in explaining the construction of the internal electrodes of the spark-quenching element shown in FIGS. 5 and 6.
Figure 9A:
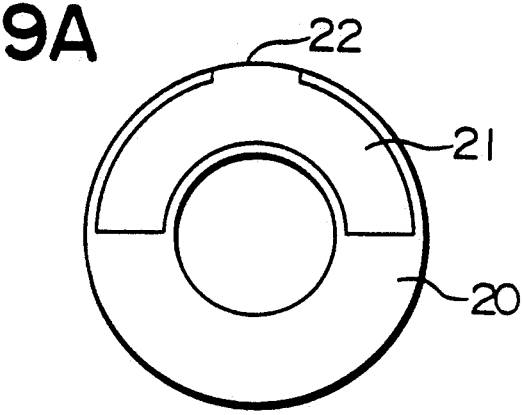
FIGS. 9A through 9C are plan views illustrating major components of the spark-quenching element shown in FIGS. 5 and 6.
Figure 9B:
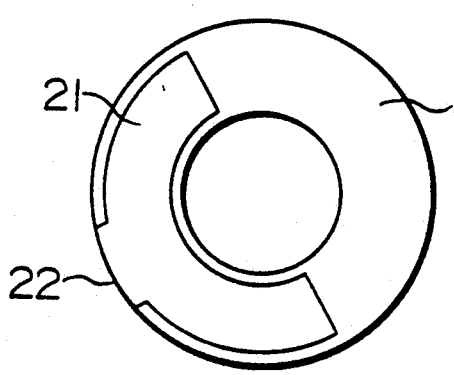
Figure 9C:
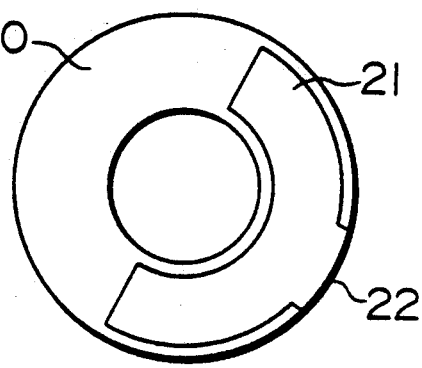

FIG. 7 is a partly cutaway enlarged perspective view of the spark-quenching element 18 shown in FIGS. 5 and 6. FIG. 8 is a diagram of assistance in explaining the construction of the internal electrodes of the aforementioned spark-quenching element 18. FIGS. 9A and 9B are plan views illustrating major components of the aforementioned spark-quenching element 18. In FIGS. 7 through 9C, numeral 20 refers to a ring-shaped thin sheet made of a highly dielectric material, such as barium titanate. Numeral 21 refers to an internal electrode formed into a sector shape with the central angle thereof being 180 degrees and having a terminal 22 facing the outer circumferential surface thereof. The ring-shaped thin sheets 20 and the internal electrodes 21 are alternately laminated, and a capacitor is formed by the portions where the internal electrodes 21 overlap (as shown by shaped portions), as shown in FIG. 8. Numeral 23 refers to an electrode to which the terminal 22 is connected to electrically connect the commutator 4 and the armature 3 shown in FIG. 5.

The measurement results obtained by continuously operating miniature motors, in which the spark-quenching elements 18 formed in the aforementioned manner were incorporated in the rotor 5 and electrically connected properly, by applying 38 volts d-c and subjecting to a fan load of approximately 20 g are shown below. In this test, $I_0 = 210$ mA, and $N_0 = 22,000$ rpm. In the table, the results for miniature motors equipped with a varistor and without spark-quenching element are also shown.

|     | Spark-quenching element | Electrostatic capacity ($\mu$F) | Life (h) |
| --- | --- | --- | --- |
| (1) | Laminated capacitor | 1.5 | 650 |
| (2) | " | 1.0 | 600 |
| (3) | " | 0.5 | 250 |
| (4) | Varistor | 0.01 | 200 |
| (5) | None | 0 | 50 |

As is evident from the table above, the motor without spark-quenching element (5) has a service life of only 50 hours. With the motor using a varistor (4), service life was extended to 200 h. Because of its electrostatic capacity of 0.01 $\mu$F, it had an insufficient spark-quenching effect. Those motors equipped with spark-quenching elements formed by laminated ceramic capacitors in the aforementioned manner (1)–(3), on the other hand, had a remarkable spark-quenching effect and an extended service life because of their high electrostatic capacity. By increasing electrostatic capacity to more than 1 $\mu$F, it was found that the acceptable service life standard of 300 hours required for household appliances, such as electric shavers and hair driers, is fully satisfied, and the life of the motor is extended remarkably.

As the highly dielectric materials that can be used for the capacitors of this invention, titanium oxide, magnesium titanate, calcium titanate, strontium titanate, barium titanate, lead titanate, lead zirconate, etc. can be used, but barium titanate having a relatively high dielectric constant is preferred.

Capacitors of electrostatic capacity less than 1 $\mu$F are not desirable because the motor life extending effect cannot be expected. That is, miniature motors used for electric shavers, hair driers usually require a warranty of 250-hour continuous operation, with the acceptable standard being set to 300 hours for the sake of safety. The electrostatic capacity of a capacitor is set to more than 1 $\mu$F in this invention because a capacitor having an electrostatic capacity of less than 1 $\mu$F cannot satisfy the acceptable standard.

Figure 10:
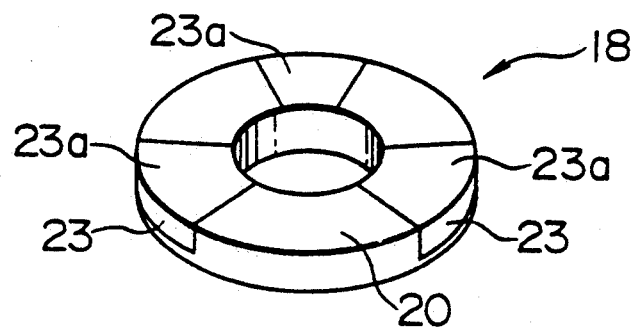
FIG. 10 is an enlarged perspective view illustrating a spark-quenching element in another embodiment of this invention.

FIG. 10 is an enlarged perspective view illustrating a spark-quenching element in another embodiment of this invention. Like parts are indicated by like numerals used in FIG. 7. In FIG. 10, numeral 23a refers to an electrode formed into an essentially sector shape and provided on the end face of the ring-shaped thin sheet 20. The electrodes 23a are electrically connected to the electrodes 23 provided on the outer periphery of the ring-shaped thin sheets 20. With this construction, the spark-quenching element can be easily mounted on the rotor, and electrical connection between the commutator 4 and the armature 3 can be facilitated.

In these embodiments, description has been made about an example in which the outer circumferential shape of the spark-quenching element is formed into a circular shape, but other geometric shapes may be used. The thickness of the ring-shaped disc and the number of lamination of the discs may be selected appropriately in accordance with the specifications of miniature motors. Materials used for the ring-shaped disc and the internal electrode of the spark-quenching element are not limited to those used in the aforementioned embodiments, but may also be selected appropriately.

This invention having the aforementioned construction and operation can accomplish the following effects.

(1) Since the spark-quenching element has a very simple construction, a large number of components are not required as in the case of the prior art. Thus, the number of assembly manhours can be reduced.

(2) Thinner miniature motors can be manufactured because the axial thickness of the spark-quenching element is small. In addition, motor torque can be increased because the space factor of coil can be increased.

(3) Since the electrostatic capacity of the spark-quenching element is large, a remarkable spark-quenching effect can be achieved, and the service life of miniature motors can be improved substantially.

What is claimed is:

1. A miniature motor comprising:
   a housing having a bottomed hollow cylindrical shape with an inner circumferential surface;
   a permanent magnet fixedly fitted to said inner circumferential surface;
   a rotor having an armature and a commutator;
   an end bracket having brushes fitted to an open end of said housing and making sliding contact with said commutator;
   input terminals electrically connected to said brushes;
   bearings rotatably supporting said rotor, said bearings being positioned on said housing and said end bracket; spark-quenching means connected between said armature and said commutator including a ring-shaped laminated ceramic capacitor having electrodes on an outer surface, said electrodes being of a same number as a number of poles of said armature, said capacitor having an electrostatic capacity of more than 1 $\mu$F, said ring shaped laminated ceramic capacitor being formed of thin sheets of highly dielectric material and thin-film internal electrodes formed of an electrically conductive material, and having a sector shape, said internal electrodes and said dielectric material being alternately laminated in an axial direction of said ring-shaped laminated ceramic capacitor, said ring-shaped laminated ceramic capacitor being formed by overlapped portions of said internal electrodes, said portions being overlapped with respect to a projected plane orthogonally intersecting an axis of said rotor.

2. A miniature motor according to claim 1, wherein said electrodes are provided on an end face of said laminated ceramic capacitor, said electrodes being electrically connected to corresponding electrodes provided on an outer circumferential surface of said ceramic capacitor.

3. A miniature motor according to claim 1, wherein an outer profile of said spark-quenching means is formed into a circular shape.

4. A miniature motor according to claim 1, wherein said spark-quenching means is fitted to said rotor.

5. A miniature motor comprising:
   a housing having a bottomed hollow cylindrical shape with an inner circumferential surface;
   a permanent magnet fixedly fitted to said inner circumferential surface;
   a rotor having an armature and a commutator;
   an end bracket having brushes fitted to an open end of said housing and making sliding contact with said commutator;
   input terminals electrically connected to said brushes;
   bearings rotatably supporting said rotor, said bearings being positioned on said housing and said end bracket; spark-quenching means connected between said armature and said commutator including a ring-shaped laminated ceramic capacitor having electrodes on an outer surface, said electrodes being of a same number as a number of poles of said armature, said capacitor having an electrostatic capacity of more than 1 $\mu$F, said ring shaped laminated ceramic capacitor being formed of thin sheets of highly dielectric material and thin-film internal electrodes formed of an electrically conductive material, and having a sector shape, said internal electrodes and said dielectric material being alternately laminated in an axial direction of said ring-shaped laminated ceramic capacitor, said ring-shaped laminated ceramic capacitor being formed by portions of said internal electrodes being overlapped in a projected plane orthogonally intersecting an axis of said rotor, each of said internal electrodes having a terminal facing an outer circumferential surface of the capacitor, wherein said electrodes on an outer surface are each connected to a corresponding terminal to electrically connect said commutator and said armature.

* * * * *